US008997348B2

(12) United States Patent
Harvie

(10) Patent No.: US 8,997,348 B2
(45) Date of Patent: Apr. 7, 2015

(54) DRY RUNNING FLEXIBLE IMPELLER PUMP AND METHOD OF MANUFACTURE

(76) Inventor: Mark R. Harvie, Milton, VT (US)

( * ) Notice: Subject to any disclaimer, the term of this patent is extended or adjusted under 35 U.S.C. 154(b) by 1206 days.

(21) Appl. No.: 12/925,331

(22) Filed: Oct. 19, 2010

(65) Prior Publication Data

US 2011/0038713 A1 Feb. 17, 2011

Related U.S. Application Data

(63) Continuation-in-part of application No. 11/655,663, filed on Jan. 19, 2007, now Pat. No. 7,866,942.

(60) Provisional application No. 60/763,937, filed on Jan. 30, 2006.

(51) Int. Cl.
*B23P 15/00* (2006.01)
*F04C 5/00* (2006.01)

(52) U.S. Cl.
CPC ............... *F04C 5/00* (2013.01); *F04C 2230/20* (2013.01); *F04C 2230/21* (2013.01); *F04C 2230/91* (2013.01); *F05C 2201/00* (2013.01); *F05C 2203/08* (2013.01); *F05C 2225/00* (2013.01); *F05C 2251/14* (2013.01)

(58) Field of Classification Search
CPC ........ B29C 31/04; B29C 33/45; B29C 33/64; B29C 39/006; F04C 5/00; F04C 2230/22; F04C 2230/91; F05C 2/02; F05C 2201/00; F05C 2203/08; F05C 2225/00; F05C 2230/21; F05C 2251/14
USPC ........................ 29/888.025, 525.01; 415/141; 418/153–154, 156
See application file for complete search history.

(56) References Cited

U.S. PATENT DOCUMENTS

| | | | | |
|---|---|---|---|---|
| 3,832,105 | A * | 8/1974 | Takahashi | 418/154 |
| 5,638,600 | A * | 6/1997 | Rao et al. | 29/888.02 |
| 7,707,720 | B2 * | 5/2010 | Klein et al. | 29/888.024 |
| 2004/0123459 | A1 * | 7/2004 | Makinson et al. | 29/889.23 |
| 2008/0219877 | A1 * | 9/2008 | Kjeldsen et al. | 418/206.9 |
| 2010/0095837 | A1 * | 4/2010 | Suman | 92/153 |

* cited by examiner

*Primary Examiner* — Alexander P Taousakis
(74) *Attorney, Agent, or Firm* — Eric R. Benson, Esq.

(57) ABSTRACT

This invention relates to a Dry Running Flexible Impeller Pump and Method of Manufacture designed to provide a flexible impeller pump capable of being run dry for extended periods of time without damage. The pump's components are comprised of low friction materials limiting the heat of friction created by the impeller in use. The impeller is cast of pre-molding silicone substrate containing a quantity of mold release that will not prevent the deposition of a low friction compound coating on the surface of the impeller in a mold that is treated with a low friction industrial coating. Once the impeller is removed from the mold it is solvent cleaned, vacuum baked at a temperature high enough to drive off residual traces of mold release or compounds used to maintain the silicone substrate in suspension, and then coated with a polymer of Poly Para Xylylene by vacuum deposition.

3 Claims, 2 Drawing Sheets

DRY RUNNING FLEXIBLE IMPELLER PUMP AND METHOD OF MANUFACTURE

CROSS REFERENCE TO RELATED APPLICATION

This Application is a Continuation-In-Part of the Co-Pending Patent Application entitled Dry Running Flexible Impeller Pump And Method Of Manufacture—Reference said Co-Pending patent application Ser. No. 11/655,663 filed Jan. 19, 2007, and claiming priority from Provisional Patent Application No. 60/763,937 which was filed on Jan. 30, 2006.

BACKGROUND ART

A review of prior and current flexible impeller pump technologies reveal that there are no acceptable prior art Dry Running Flexible Impeller Pumps that permit a flexible impeller pump to be run dry, even for a very few seconds, without certain catastrophic failure of the pump in general and specifically the impeller. Ironically, the very applications for which flexible impeller pumps are especially suited, are generally those types of situations where a finite source of fluids are sought to be disposed of completely where the pumping process is intended to completely pump all fluid present. It is these precise situations where a user, perhaps distracted by something else, leaves the impeller pump on to do its job emptying a vessel or fluid repository and then forgets that it has been left running, then the fluid runs dry, the pump housing runs dry and the friction of the impeller against the cam of the pump housing causes an almost immediate failure of the impeller. Any one of a number of consequences may occur as a result of being run dry. The impeller blades or vanes can rip through the bead. The bead of the impeller blades or vanes may wear flat. The bead may become pitted. The blade or vane can also experience cavitation or even tear. Lastly the blade or vane bows and sets such that the bead no longer contacts the cam. Each of these in essence lead to the same result, the pump no longer functions for its intended purpose.

Flexible impeller pumps are relatively simple devices that are easy to construct and able to pump a wide range of fluids. Impeller pumps are generally self-priming and can lift fluids several feet. Other than the motor that drives the pump the pump itself has only one moving part, namely a flexible impeller.

Most flexible impellers are molded from either neoprene or nitrile rubber with blades or vanes arranged around a hub. The end of each blade or vane has a bead, a somewhat rounded or fattened end opposite the hub. The impellers with few blades and small-diameter hubs are used to provide low-pressure, high-volume pumping capacity. Impellers with more blades or vanes and bigger hubs are used to provide lower-volume and higher-pressure pumping.

The flexible impellers are mounted inside a hollow housing that is mostly circular. A portion of this housing is indented forming a cam. The shaft of a drive motor is keyed into the hub of the flexible impeller such that when the pump's drive motor is turned on the flexible impeller will turn inside the pump's housing. As the impeller turns in the housing each blade is flexed in the cam area of the pump housing and as the impeller turns and eventually leaves the cam each blade straightens and increases the volume of the cavity formed between it and the next blade or vane. It is this expansion that causes suction which in turn then draws in the fluid being pumped. The straightened flexible impeller continues to rotate and as it does, it carries the fluid along with it. As this same blade or vane now contacts the cam it again begins to fold and compress the volume between it and the next blade. It is this compression of the fluid that creates a pressure that forces the fluid out the discharge port. This cycle continues with each next blade providing a smooth non-pulsating flow of pumped fluid.

Flexible impeller pumps are convenient and inexpensive being designed such that the fluids being pumped act as lubrication for the pump during the process of pumping. Therein, lies the problem with the current and the prior art flexible impeller pumps. Since the pump requires the fluid being pumped to be present in order to remain lubricated, once the pump runs dry the friction of the impeller against the cam portion of the pump housing will cause permanent damage to the impeller within no more than 15 to 20 seconds of dry running operation and in some cases even less.

The pump housings for impeller pumps may be made from a variety of materials. Many of the lowest cost pumps have a molded-plastic housing with a stamped steel cup or liner. The macerator pumps are designed without a steel liner. The most common housings for impeller pumps, however, are machined from cast metals, usually bronze, which have circular machined cavities. The cam, which is usually arc shaped, is screwed inside the cavity as a separate piece, and a cover plate with fluid tight gasket is then screwed onto the housing.

Examples of impeller pumps are taught in several patents such as those taught by E. C. Rumsey in U.S. Pat. No. 2,455,194, Takahashi in U.S. Pat. No. 3,832,105, and McCormick in U.S. Pat. No. 4,940,402. The Rumsey and McCormick patents each describe the impellers as having weights secured to the end of each vane or blade. The weight is added to keep the end of the vane or blade in contact with the housing wall and cam area as pressure against the vanes or blades increases. In practice, however, these prior art patents teach a pump technology wherein the rotation speed of the impeller increases, fluid will begin to pass between the impeller and the housing wall limiting the effective speed and maximum operating pressure of the pump. Rumsey also teaches a slot formed in a central bore of the impeller and a mating rib formed on the shaft of the drive motor for the pump. The impeller then is placed on the shaft such that the rib on the motor's shaft fits into the slot formed in the impeller. This key configuration is intended to reduce impeller slippage on the shaft as the shaft rotates at higher speeds and pressure within the housing increase, however, the slot may begin to slip over the rib and ultimately the impeller rotates on the shaft.

Takahashi describes a pump device that includes a flexible impeller similar to the instant application wherein the impeller is sandwiched between two plates. The flexible impeller is attached to the shaft of the pump, such that the rotation axis of the flexible impeller is aligned with the rotation axis of the shaft of the pump drive motor. The plates are either rotating on a bearing surface or suspended within the housing so that a portion of the plates bore contacts the drive motor's shaft. The inner surface of the bore on which each plate rotates is especially subject to wear especially if the pump is run dry.

Maki describes in U.S. Pat. No. 6,203,302 a high pressure fluid forcing pump that has a cavity adaptable for receiving a flexible impeller assembly rotatable within the cavity of the pump housing. The flexible impeller assembly includes a flexible impeller engaged between two bearing plates and having tips fixed to the bearing plates adjacent an outer circumference of the bearing plates. Maki further teaches a flexible impeller assembly that includes a locking arrangement that ensures that the impeller rotates about the motor shaft of the pump. The motor's shaft is positioned in the cavity of the pump's housing, and the rotational axis of the shaft and impeller are offset from the longitudinal axis of the cavity and the two bearing plates. Despite its improvement over E. C. Rumsey in U.S. Pat. No. 2,455,194, Takahashi in U.S. Pat. No. 3,832,105, and McCormick in U.S. Pat. No. 4,940,402, Maki also fails to teach a flexible impeller pump that may be run dry for any more than just a few seconds without permanently damaging the impeller and/or the pump.

While each of these prior art flexible impeller pump devices fulfill their respective particular objectives and requirements, and are most likely quite functional for their intended purposes, it will be noticed that none of the prior art cited disclose an apparatus and/or method of manufacture that is capable of being run dry for extended periods of time without pump failure.

As such, there apparently still exists the need for a new and improved flexible impeller pump to maximize the benefits to the user and minimize the risks of expensive damage to the pump when it is run dry.

In this respect, the present invention disclosed herein substantially corrects these problems and fulfills the need for such a device.

DISCLOSURE OF THE INVENTION

In view of the foregoing limitations inherent in the known types of flexible impeller pumps now present in the prior art, the present invention provides an apparatus that has been designed to provide the following features for a user:

- Effective non-pulsating fluid pumping
- Durable and able to withstand neglect in cleaning and operation where the pump is likely to be neglected and run dry
- Able to be run dry for more than a thousand times longer than current technology impeller pumps
- Resistant to chemical agents
- Easy to maintain These features are improvements which are patently distinct over similar devices and methods which may already be patented or commercially available. As such, the general purpose of the present invention, which will be described subsequently in greater detail, is to provide a field designed apparatus and method of manufacture that incorporates the present invention. There are many additional novel features directed to solving problems not addressed in the prior art.

To attain this the present invention generally comprises five major components: 1) a Flexible Impeller sandwiched between; 2) one or more End Plates mounted to; 3) a Pump Housing to which is attached; 4) a Drive Motor Mount to which is attached; 5) a Drive Motor the shaft of which is keyed into the Flexible Impeller to rotate the Flexible Impeller within the Pump Housing and between the two End Plates. In order to reduce friction and permit the pump to be run dry the parent application, of which this application is a continuation in part, taught that the two End Plates and the Pump Housing would be coated with Magnaplate HCR® (This process results in a surface dynamic coefficient of friction of 0.17). In the instant continuation in part application, however, the End Plates and the Pump Housing are cast from materials that have a lower coefficient of friction than uncoated metals typically used for pump housings and their component parts. These materials in the preferred embodiments of this invention are generally selected from a group of thermoplastic polymers such as Poly Ether Ether Ketone (unfilled, glass filled or carbon filled), Poly Phenylene Sulfide, Polyoxymethylene, Polyformaldehyde, Polyacetal, Tetrafluoroethylene polymers and fluoropolymers, and Perfluoroalkoxy polymers resins, as well as any others that are developed in the industry virtually daily. Ideally the thermopastic polymer that is selected will have a low coefficient of friction and a high coefficient of thermal conductivity. In as much as the need for heat dissipation in the pump housing stems from its contact or friction with the impeller while in use, the thermoplastic's coefficient of friction being low is the most important physical property of the thermoplastic. Just as in the parent application of this continuation in part application, the Flexible Impeller is cleaned with an appropriate solvent, baked at a temperature sufficient to drive off an residual solvents, mold release (if used) or other volatile compounds that may be present such as the compounds use to maintain the silicone substrate in suspension, which is to prepare the surface for vacuum deposition of a selected Parylene compound coating (Poly Para Xylylene Polymer) such as Parylene N, Parylene C or Parylene D.

These together with other objects of the invention, along with the various features of novelty which characterize the invention, will be pointed out with particularity in the claims. For a better understanding of the invention, its operating advantages and the specific objects attained by its uses, reference should be had to the accompanying drawings and descriptive matter in which there is illustrated preferred embodiments of the invention.

BEST MODES FOR CARRYING OUT THE INVENTION

I. Preferred Embodiments

Figure 1:
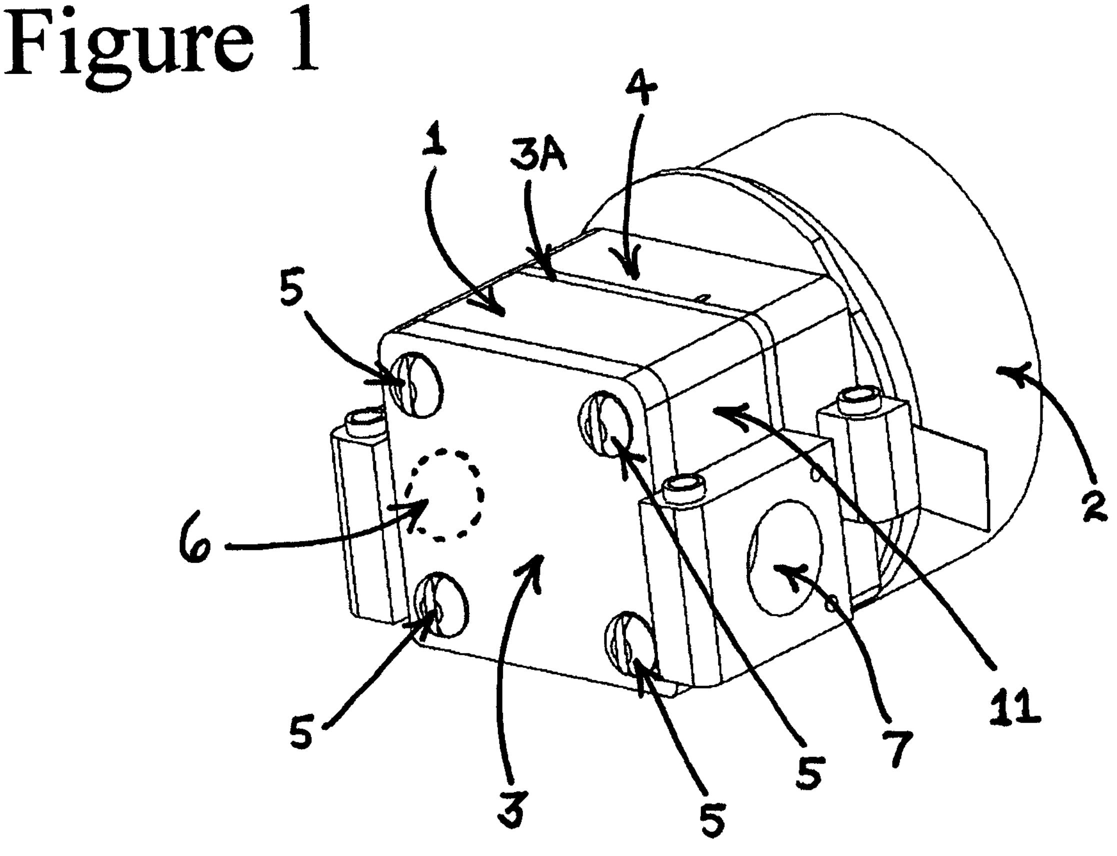
FIG. 1 is perspective view of the Dry Running Flexible Impeller Pump assembled for operation.
Figure 2:
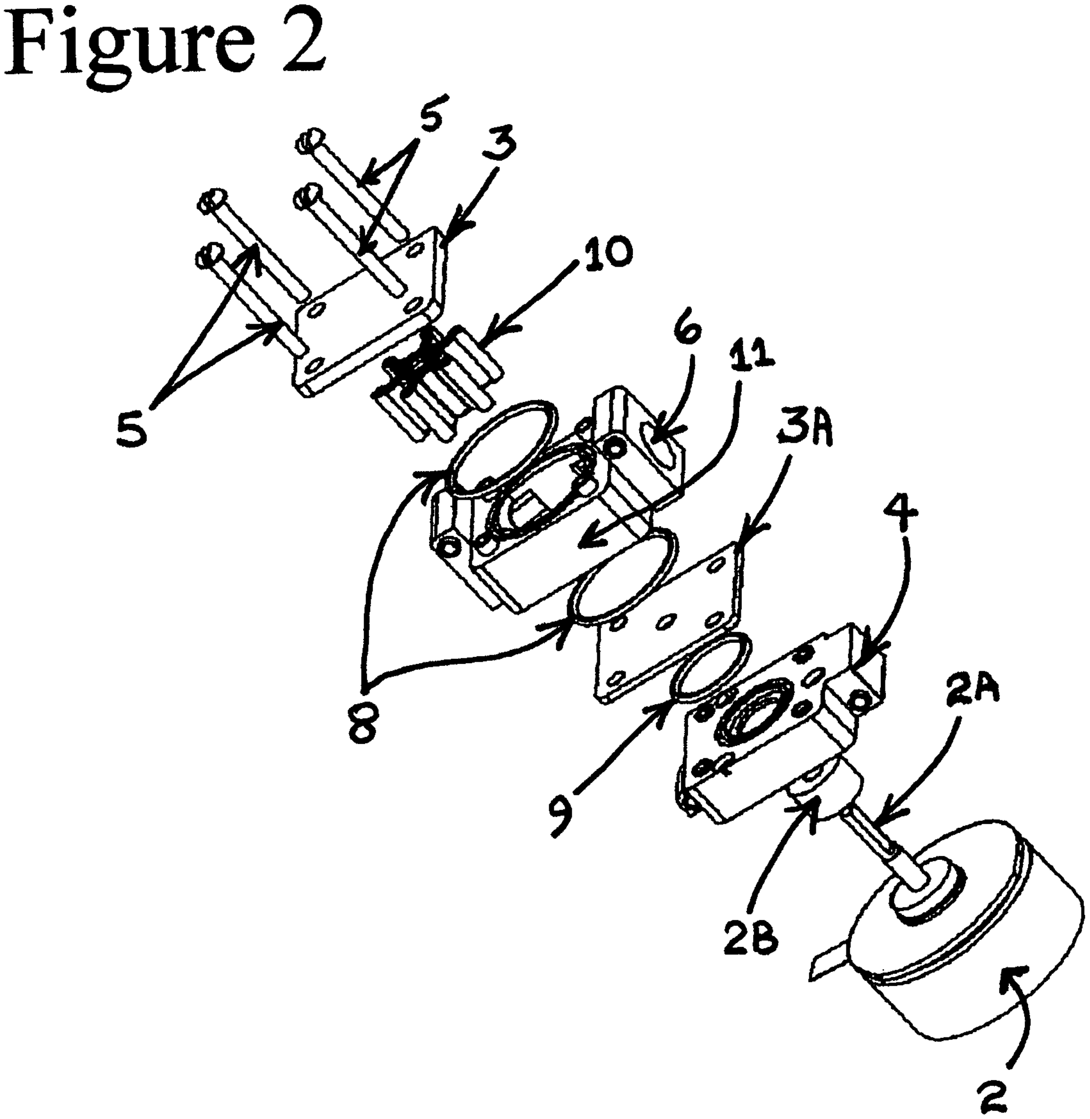
FIG. 2 is an exploded perspective view of the Dry Running Flexible Impeller Pump.

With reference now to the drawings, and in particular to FIGS. 1-2 thereof, a new and novel Dry Running Flexible Impeller Pump device embodying the principles and concepts of the present invention is depicted in these drawings as comprising five major components: 1) a Flexible Impeller (10) sandwiched between; 2) two End Plates (3) mounted to; 3) a Pump Housing (11) to which is attached; 4) a Drive Motor Mount (4) to which is attached; 5) a Drive Motor (2) the Drive Motor Shaft (2A) of which is keyed into the Flexible Impeller (10) to rotate the Flexible Impeller (10) within the Pump Housing (11) and between the two End Plates (3), and the Dry Running Flexible Impeller Pump is generally designated by the reference numeral (1).

General Description of Reference Numerals in the Description and Drawings

Any actual dimensions listed are those of the preferred embodiment. Actual dimensions or exact hardware details and means may vary in a final product or most preferred embodiment and should be considered means for so as not to narrow the claims of the patent.

LIST AND DESCRIPTION OF COMPONENT PARTS OF THE INVENTION (1) Dry Running Flexible Impeller Pump
(2) Drive Motor
(2A) Drive Motor Shaft
(2B) Drive Motor Shaft Bushing
(3) End Plate (3A) Motor Side End Plate
(4) Drive Motor Mount
(5) Screw
(6) Intake Port
(7) Discharge Port
(8) End Plate Gasket
(9) Drive Motor Mount Gasket
(10) Flexible Impeller
(11) Pump Housing

DETAILED DESCRIPTION OF THE PREFERRED EMBODIMENTS

The most preferred embodiment of the Dry Running Flexible Impeller Pump (1) depicted in FIGS. 1 and 2 is manufactured and comprised of the following components in their respective functional relationships:

The invention accomplishes its intended purpose of producing an impeller pump that may be run dry by using low friction components and applying low friction industrial coatings to critical components of the Dry Running Flexible Impeller Pump. In the most preferred embodiment of the parent application, of which this application is a continuation in part, the Pump Housing (11) and End Plates (3) were made from 6061 aluminum and each anodized with an industrial coating such as Magnaplate HCR® with a thickness of 0.0017"-0.0023", which produced a 50% build up and a 50% penetration in the aluminum. This process resulted in a surface dynamic coefficient of friction of 0.17 (HCR to HCR surface). This coating also hardened the aluminum surface to a Rockwell C hardness scale of 65 and improved the thermal conductivity of coated versus uncoated aluminum. The use of aluminum in the parent application, while very effective when coated, proved to be relatively expensive as would be the use other low friction materials such as Hard Carbon, Diamond, and BAM (the ceramic alloy created from an alloy of boron, aluminum and magnesium ($AlMgB_{14}$) and titanium boride ($TiB_2$)), etc.

In the art, new models are beginning to indicate that kinetic friction can be greater than static friction. Contrary to the earlier explanations of static versus kinetic friction, kinetic friction is now understood not to be principally caused by surface roughness but by chemical bonding between the surfaces. Surface roughness and contact area obviously do affect kinetic friction for micro- and nano-scale objects where surface area forces tend to dominate inertial forces. This is especially critical with respect to the instant invention since it is the kinetic friction of the Flexible Impeller (10) against the Pump Housing (11) and End Plates (3) that will cause a build of heat and eventual breakdown of the Flexible Impeller (10) and failure of the Dry Running Flexible Impeller Pump (1) when run dry. Through additional testing and experimentation with various low coefficient of friction (and relatively low cost) thermoplastic polymers it was discovered that the same or similar results were obtained in comparison to the coated aluminum, the Dry Running Flexible Impeller Pump's (1) ability to run dry for a significant period of time without failure. The Most Preferred Embodiment of this continuation in part application the Pump Housing (11) and End Plates (3) are cast from thermoplastic polymers having a low coefficient of friction such as Poly Ether Ether Ketone (unfilled, glass filled or carbon filled), Poly Phenylene Sulfide, Polyoxymethylene, Polyformaldehyde, Polyacetal, Tetrafluoroethylene polymers and fluoropolymers, and Perfluoroalkoxy polymers resins, as well as any others that are developed in the industry virtually daily. In experimentation it was found that when the Parylene N coated Flexible Impeller (10) was placed in an uncoated aluminum pump housing and run dry the Impeller (10) was destroyed in a matter of a few seconds. Aluminum's coefficient of kinetic friction (Al/Al)$\mu_k$ is 1.4 and Parylene N's (poly-para-xylylene) coefficient of kinetic friction (parylene n/parylene n)$\mu_k$ is 0.25 (ASTM D 1894).

It is well understood in the art that due to the complex forces involved in the force of friction at the present time that there is no formula to calculate the coefficient of friction for a material and it can only be arrived at by empirical means, i.e. experimentation. In the Most Preferred Embodiment it was discerned through experimentation that the Dry Running Flexible Impeller Pump (1) could run completely dry for several hours without failure when the Flexible Impeller (10) is manufactured as set forth below and the Pump Housing (11) and End Plates (3) are cast from thermoplastic polymers having a low kinetic coefficient of friction ($\mu_k$) of less than 1.0. As mentioned above there are many other materials that could be used that currently exist that have a very low $\mu_k$, however, the costs of these materials are often prohibitive.

In the Most Preferred Embodiment the Flexible Impeller (10) is injection molded from (LSR) Liquid Silicon Rubber or (HCR) High Compression (silicon) Rubber. It is critical to the object of this invention that the pre-molding silicone substrate that is to be molded contain no mold release compositions of any kind, or uses a mold release that will not prevent the adhesion or bonding of a low friction industrial coating to the cast Flexible Impeller (10), either of which is unknown in the current art. It is additionally critical that the mold from which the Flexible Impeller (10) is cast will itself be coated or anodized with a low friction industrial coating such as Magnaplate HCR®. The Flexible Impeller (10) is molded without the use of any type of mold release on the mold itself, or uses a mold release that will not prevent the adhesion or bonding of a low friction industrial coating to the cast Flexible Impeller (10), and since the mold itself has been anodized with Magnaplate HCR® the Flexible Impeller (10) is easily removed from the mold without the use of any mold release after it is cast, or because of the use of a mold release that will not prevent the adhesion or bonding of a low friction industrial coating to the cast Flexible Impeller (10). The absence of mold release, or use of a mold release that will not prevent the adhesion or bonding of a low friction industrial coating to the cast Flexible Impeller (10) is critical because of the potential of contamination of the surface of the Flexible Impeller (10) that will prevent the molecular bonding of a critical low friction industrial coating described below. In the Most Preferred Embodiment the Flexible Impeller (10) the low friction industrial coating is a Paralene N coating which is a polymer of Poly Para Xylylene, however any polymer of Poly Para Xylylene may be used with similar results. The Flexible Impeller (10) must then be cleaned with a suitable solvent such as alcohol and baked at a temperature high enough to drive off any residual traces of mold release or compounds used to maintain the silicone substrate in suspension. Temperatures of around 100° C. have been found to be effective. The Paralene N is applied to the cleaned and heated Flexible Impeller (10) with specialized vacuum deposition equipment that permits control of coating rate and thickness. The deposition process takes place at the molecular level as the chemical, in dimer form, is converted under vacuum and heat to dimeric gas; pyrolized to cleave the dimer; and finally deposited as a clear polymer film. The Paralene N is applied at 0.0002-in per hour with a coating thicknesses from 0.100 to 76 microns which can be applied in a single operation. The Parylene N vacuum chamber bonding to the silicon rubber of the Flexible Impeller (10) results in Flexible Impeller (10) having a coefficient of kinetic friction of 0.25 as compared to >1.0 for the uncoated silicone rubber. There is no other method known in the art to apply a low friction industrial coating to silicone rubber. All other methods have proven unacceptable insofar as the coating will cleave off the silicone rubber after minimal use or flexion of the silicone rubber.

The Drive Motor Shaft (2A) end of the Drive Motor (2) is inserted through the Drive Motor Shaft Bushing (2B), then through the central bore of the Drive Motor Mount (4), then through the Drive Motor Mount Gasket (9), then through the central bore of the Motor Side End Plate (3A), then through the End Plate Gasket (8), then through the Pump Housing (11), then through a second End Plate Gasket (8), then the end of the Drive Motor Shaft (2A) fits into a notched hole in the Flexible Impeller (10) that is cast into a shape and size capable of accepting the Drive Motor Shaft (2A) tightly within the Flexible Impeller (10) such that as the Drive Motor Shaft (2A) is turned by the Drive Motor (2) the Flexible Impeller (10) will turn with the Drive Motor Shaft (2A) not allowing the Drive Motor Shaft (2A) to spin within the cast notched hole.

The End Plate (3) is then backed up against the Flexible Impeller (10) on the opposite end of the Dry Running Flexible Impeller Pump (1) from the Drive Motor (2). Screws (5) are then inserted through mounting holes in the corners of the End Plate (3) which then pass through corresponding holes in the Pump Housing (11) the Motor Side End Plate (3A) and then are securely screwed into corresponding threaded holes tapped into the Drive Motor Mount (4) thereby creating a fluid tight seal of all the component parts as the End Plate Gaskets (8) and the Drive Motor Mount Gasket (9) are seated and sealantly engaged between the corresponding components as illustrated in FIG. 2. The Drive Motor (2) may be powered by any means required by a user, such as electricity, gas, hydraulic, or combustion engine. When power is added to the Drive Motor (2) it causes the Flexible Impeller (10) to turn within the Pump Housing (11) such that as it flexes and straightens over the internal cast cam area it creates a suction on the Intake Port (6) of the Pump Housing (11) such that it will draw into the Pump Housing (11) a user selected fluid and then discharge the fluid with pressure out the Discharge Port (7). Depending upon the required usage of the Dry Running Flexible Impeller Pump (1) by a user, intake and discharge hoses and other apparatus may be attached as needed.

While my above descriptions of the invention, its parts, manufacture and operations contains many specificities, these should not be construed as limitations on the scope of the invention, but rather as exemplifications of present embodiments thereof. Many other variations are possible, for example, other embodiments, shapes, and sizes of the device can be constructed and designed to work by the principles of the present invention; various materials, colors and configurations can be employed in the device's design that would provide interesting embodiment differences to users. It is not necessary, for example, that the pump housing and end plates be manufactured from thermoplastics since other suitable materials exist which have a very low $\mu_k$ or coefficient of kinetic friction that will achieve the same result in practice. It also would be obvious to have a cast pump housing that uses just one end plate. The pump housing and end plates could be manufactured of other metals, polymers or plastics, which in turn may be coated with low friction coatings by anodizing in the case of metals or polymerization deposition as in the case of polymers and plastics. Similarly these components could be made from ceramics (i.e. BAM), and similarly either uncoated or coated for low friction contact with the flexible impeller. Similarly, the flexible impeller could also be made of other materials with similar flexing characteristics such as rubber, and related polymers and rubber substitutes and teflon. The power supply to the Drive Motor (2) may also be photovoltaic, as well as many other obvious variations.

Accordingly, the scope of the invention should be determined not by the embodiments illustrated, but by the claims and their legal equivalents which accompany this application.

Having described my invention, I claim:

1. A method of manufacturing a dry running flexible impeller pump comprised of the steps of:

selecting an injection mold capable of casting silicon rubber from a pre-molding silicone substrate to form a flexible impeller in a desired shape and size;

coating with a low friction compound the surfaces of the injection mold that have contact with the flexible impeller as it is being molded;

constructing a pump housing from material with a coefficient of kinetic friction of 1.0 or less and wherein the pump housing is constructed with an intake port and a discharge port wherein the constructed pump housing will consist of a shape and size such that when the flexible impeller rotates inside the pump housing a suction on the intake port is created wherein a fluid may thereby be drawn into the intake port then into the pump housing and exhausted therefrom by the flexible impeller through the discharge port;

casting the flexible impeller in the coated injection mold from a pre-molding silicone substrate that contains a quantity of mold release that will not prevent the deposition of a low friction coating on the surface of the flexible impeller;

removing the flexible impeller from the coated injection mold;

cleaning the surfaces of the flexible impeller;

heating the flexible impeller in a vacuum;

coating with a low friction compound the heated flexible impeller while under vacuum by vacuum chamber bonding deposition;

selecting a pump power means;

constructing a pump shaft capable of inserting into the pump housing and capable of attaching to the flexible impeller and the pump power means;

assembling the dry running flexible impeller pump by attaching the pump power means to the pump shaft which pump shaft is inserted into the pump housing and the pump shaft is then attached to the flexible impeller rotatably disposed inside the pump housing such that when the pump power means is engaged the pump shaft turns inside the pump housing thereby causing the flexible impeller to rotate inside the pump housing causing a suction thereby on the intake port wherein a fluid may thereby be drawn into the intake port by the suction and the fluid then enters into the pump housing and is exhausted therefrom by the flexible impeller through the discharge port.

2. The method of manufacturing a dry running flexible impeller pump of claim 1 wherein:

the coating with a low friction compound of the heated flexible impeller while under vacuum by vacuum chamber bonding deposition is comprised of a polymer of Poly Para Xylylene.

3. The method of manufacturing a dry running flexible impeller pump of claim 1 wherein:

the coating with a low friction compound of the surfaces of the injection mold that have contact with the flexible impeller as it is being molded is comprised of anodizing the surfaces with a low friction industrial coating.

* * * * *